United States Patent [19]

Challener, IV

[11] Patent Number: 5,639,567
[45] Date of Patent: Jun. 17, 1997

[54] EXCHANGE-COUPLED DIRECT OVERWRITE MAGNETO-OPTIC RECORDING MEDIA

[75] Inventor: William A. Challener, IV, Grant Township, Washington County, Minn.

[73] Assignee: Imation Corp.

[21] Appl. No.: 208,726

[22] Filed: Mar. 9, 1994

[51] Int. Cl.$^6$ ................................. G11B 5/66
[52] U.S. Cl. .......... 428/684 ML; 478/694 MM; 478/694 EC; 478/694 RE; 478/900; 369/13
[58] Field of Search ............. 428/694 EC, 694 RE, 428/694 MC, 694 MM; 369/13

[56] References Cited

U.S. PATENT DOCUMENTS

| | | | |
|---|---|---|---|
| 4,753,853 | 6/1988 | Sato et al. | 428/679 |
| 4,878,132 | 10/1989 | Aratani et al. | 360/59 |
| 5,132,945 | 7/1992 | Osato et al. | 369/13 |
| 5,204,193 | 4/1993 | Sato et al. | 428/694 R |

FOREIGN PATENT DOCUMENTS

| | | |
|---|---|---|
| 0225141A2 | 6/1987 | European Pat. Off. . |
| 3619618A1 | 12/1986 | Germany . |
| 3-296938 | 12/1991 | Japan . |

*Primary Examiner*—Leszek Kiliman
*Attorney, Agent, or Firm*—Eric D. Levinson

[57] ABSTRACT

A magneto-optic recording medium for use with a recording system including a laser beam operable at at least two different energy levels and magnetic field source(s) for generating two different magnetic fields. The medium includes a substrate and at least two layers: a magneto-optical storage layer and a magnetic biasing layer. The storage layer maintains areas of selected magnetic orientation and is made of a rare earth transition metal alloy, such as terbium-iron-cobalt. The magnetic biasing layer is magnetically exchange-coupled to the storage layer and is made of a rare earth transition metal alloy, such as dysprosium-terbium-iron-cobalt. The Curie temperature of the storage layer is greater than that of the bias layer.

27 Claims, 10 Drawing Sheets

EXCHANGE-COUPLED DIRECT OVERWRITE MAGNETO-OPTIC RECORDING MEDIA

FIELD OF THE INVENTION

This invention relates to magneto-optic storage media, and in particular, to exchange-coupled direct-overwrite magneto-optic media.

BACKGROUND OF THE INVENTION

In magneto-optic recording, data is represented by a magnetized domain. As used herein, a magnetized "domain" is a stable magnetizable region having a preferential magnetized orientation. The preferentially magnetized domain is often referred to as a "bit." The preferential magnetized orientation is caused by an energy source, such as a laser, of sufficient intensity heating the medium above its Curie temperature while the medium is simultaneously biased by a magnetic field. The laser is used to heat the magnetic medium in the localized area. When the localized area exceeds the Curie temperature, the magnetization direction is set by the magnetic field.

When the laser beam is removed, the bit cools in the presence of the biasing magnetic field and has its magnetization switched to that direction. The momentary temperature rise in the bit reduces the bit's coercive force so that the magnetic biasing field forces the magnetization of the domain to conform to the direction of the biasing magnetic field as the bit cools below its Curie temperature.

To write again on the recording medium, conventional practice has been to erase what has been recorded. To accomplish the erasure, any given bit is exposed to a laser beam of sufficient intensity while also exposing that bit to a magnetic field in an opposite direction and permitting that bit to cool. This erasure step sometimes is referred to as an initialization step. The medium is then ready for writing on. Thus, the conventional write-over procedure requires two steps: a first erase or initialization step and a second recording or write-over step.

Various techniques have been proposed for making magneto-optic media directly overwritable. One is a hybrid optical/magnetic technique which relies on magnetic field modulation to write data on the medium. Another is a laser power modulation technique, in which the magnetic field is not varied, but instead, the laser power is modulated according to the input data stream between two different power levels. This latter technique has the advantage of being suitable for laser diode arrays, and therefore, in principle, it is capable of extremely high data transfer rates.

Exchange-coupled direct overwrite techniques make use of laser power modulation to determine the direction of magnetization of the written bit. In some prior art techniques, a large initialization magnet is required in addition to the smaller write magnet. In another technique, only the smaller write magnet is required. When the laser is pulsed to the low-write power level, a bit is formed in the storage layer. When the laser is pulsed to the high-write power level, the bit is formed in a lower bias layer and then copied into the storage layer as the film stack cools. Because the bit is formed initially in the bias layer during the high-write power operation, the magnetic properties of the bias layer must be carefully chosen to obtain well defined bit edges for copying.

SUMMARY OF THE INVENTION

The present invention relates to a magneto-optic recording medium for use with a recording system including a laser beam operable at at least two different energy levels and magnetic field source(s) for generating two different magnetic fields. The medium includes a substrate and at least two layers: a magneto-optical storage layer and a magnetic biasing layer. The storage layer maintains areas of selected magnetic orientation and is made of a rare earth transition metal alloy, such as terbium-iron-cobalt. The magnetic biasing layer is magnetically exchange-coupled to the storage layer and is made of a rare earth transition metal alloy. The Curie temperature of the storage layer must be greater than that of the bias layer.

A recorded bit in the medium can exist in one of four states. If the storage layer is magnetized in an arbitrarily designated "up" direction, then in the first state the bias layer is magnetized in a direction so that there is no horizontal domain wall between the layers. In the second state the bias layer is magnetized so that a horizontal domain wall exists between the layers. When the storage layer is magnetized in the "down" direction, in the third state the bias layer is magnetized so that there is no horizontal domain wall between the layers. In the fourth state the bias layer is magnetized so that there is a horizontal domain wall between the layers.

The medium must meet four criteria: (1) at ambient temperature and no applied magnetic field the fourth state is stable, (2) at ambient temperature in the presence of a magnetic field applied in a direction opposite to the magnetic moment of the bias layer the third state is converted into the fourth state (or, equivalently, the first state is converted into the second state), (3) at a recording temperature greater than ambient but less than the Curie temperature of the bias layer, in the presence of a magnetic field applied in the direction of the first magnetic moment, the fourth state is converted to the first state (or, equivalently, the second state is converted to the third state), and (4) at a second, higher recording temperature, in the presence of the second magnetic field applied in the direction opposite the first magnetic moment, the first magnetic moment reverses its direction.

The present invention also includes a magneto-optic recording system which uses the medium described above.

DETAILED DESCRIPTION

Figure 1:
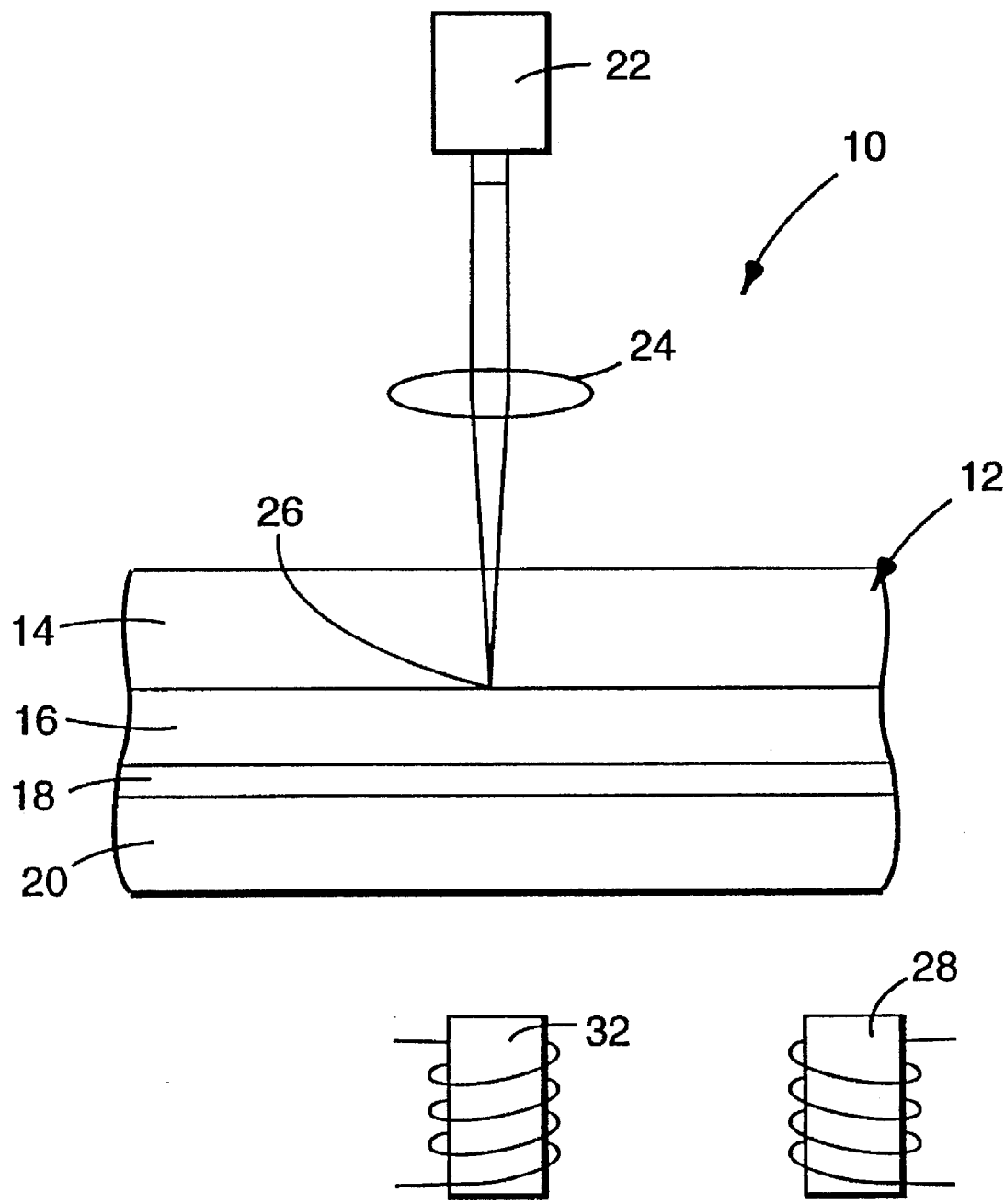
FIG. 1 is a schematic cross sectional view of one embodiment of the invention.

One embodiment of the present invention is shown schematically as recording system 10 in FIG. 1. System 10 includes recording medium 12, which is comprised of substrate 14, storage layer 16, magnetic bias layer 20 and an optional coupling layer 18 provided between the storage and bias layers. Optional coupling layer 18 is used to adjust the domain wall energy between storage layer 16 and bias layer 20, if necessary. Optional dielectric layers (not shown) may be provided between substrate 14 and storage layer 16 and on the side of bias layer 20 opposite the storage layer to improve the optical properties and/or environmental stability of the media.

All of the layers are deposited on substrate 14 using conventional sputtering techniques. Although substrate 14 is illustrated with storage layer 16 closer to the substrate than bias layer 20, the order of the layers could be reversed.

As shown in FIG. 1, a low power laser 22 directs a beam through lens 24 which focuses the beam to a point at bit 26, thereby heating the bit to the write temperature. Laser 22 operates at at least two different energy levels: a first energy level to heat recording medium 12 to a first recording temperature, $T_1$, and a second energy level to heat the medium to a second recording temperature, $T_2$. Laser 22 preferably also operates at a third energy level (lower than the first two energy levels) for reading medium 12. First magnetic field source 28 provides a magnetic field sufficient to initialize bit 26. Second magnetic field source 32 provides a magnetic field sufficient to write bit 26.

Storage layer 16 is designed so that its coercivity is large at ambient temperature but lower at the recording or writing temperature. Suitable materials for storage layer 16 include amorphous rare earth transition metal alloys such as terbium-iron-cobalt (TbFeCo), gadolinium-terbium-iron (GdTbFe), or RE-FeCo where RE includes one or more of Tb, dysprosium (Dy), holmium (Ho), and erbium (Er), and could also include neodymium (Nd), praseodymium (Pt), samarium (Sm), and/or Gr. Suitable Curie and compensation temperatures may be chosen by varying the relative proportions of the elements in the composition. A preferred rare earth transition metal alloy for storage layer 16 is $Tb_{22.5}Fe_{68}Co_{9.5}$.

Preferred materials for bias layer 20 include rare earth alloys such as RE-Fe, RE-Co, or RE-FeCo, where RE is defined as above. Suitable Curie and compensation temperatures may be chosen by varying the relative proportions of the elements in the composition. A preferred rare earth transition metal alloy for bias layer 20 is $Dy_{16.4}Tb_{13.2}Fe_{30.6}Co_{39.8}$.

The invention is suitable for use with laser power modulation overwrite techniques. Even though the Curie temperature of storage layer 16 is greater than that of bias layer 20, recording medium 12 is nevertheless compatible with recording systems that are capable of recording on exchange-coupled direct-overwrite media where the Curie temperature of the storage layer is less than that of the bias layer. However, the magnetic properties of the layers in the invention are distinctly different from those described in the prior art, and are advantageous for obtaining high-signal, low-noise media.

In the present invention, the Curie temperature of storage layer 16 is greater that the Curie temperature of bias layer 20. There are three advantages to this: First, bit 26 is formed first in storage layer 16 for both the high- and low-write levels, so that no copying of the bit from bias layer 20 to the storage layer is required. As a result, only the magnetic properties of storage layer 16 need to be specifically chosen to obtain good bit edge definition. Second, the requirements for bias layer 20 are relaxed, thereby allowing a wider range of suitable alloys for the bias layer. Third, storage layer 16 can be chosen to have a Curie temperature substantially higher than those of the previous techniques. As a result, both the signal level and the $M_sH_c$ magnetic energy product of storage layer 16 can be increased. A larger $M_sH_c$ gives rise to greater bit stability.

The Curie temperature of storage layer 16 is preferably within the range of from about 40° to 60° C. greater than the Curie temperature of bias layer 20. The Curie temperature of storage layer 16 is preferably within the range of from about 180° to 260° C. The Curie temperature of bias layer 20 is preferably within the range of from about 140° to 200° C. Although $Tb_{22.5}Fe_{68}Co_{9.5}$ and $Dy_{16.4}Tb_{13.2}Fe_{30.6}Co_{39.8}$ have been described as preferred materials for storage layer 16 and bias layer 20, respectively, those skilled in the art will appreciate that variations in the exact chemical composition of the rare earth transition metal alloys may be made so long as the desired physical properties described by the present invention are still achieved.

A recorded bit in the medium can exist in one of four states. If the storage layer is magnetized in an arbitrarily designated "up" direction, then in the first state the bias layer is magnetized in a direction so that there is no horizontal domain wall between the layers. In the second state the bias layer is magnetized so that a horizontal domain wall exists between the layers. When the storage layer is magnetized in the "down" direction, in the third state the bias layer is magnetized so that there is no horizontal domain wall between the layers. In the fourth state the bias layer is magnetized so that there is a horizontal domain wall between the layers.

The medium must meet four criteria: (1) at ambient temperature and no applied magnetic field the fourth state is stable, (2) at ambient temperature in the presence of a magnetic field applied in a direction opposite to the magnetic moment of the bias layer the third state is converted into the fourth state (or, equivalently, the first state is converted into the second state), (3) at a recording temperature greater than ambient but less than the Curie temperature of the bias layer, in the presence of a second magnetic field applied in the direction of the first magnetic moment, the fourth state is converted to the first state (or, equivalently, the second state is converted to the third state), and (4) at a second, higher recording temperature, in the presence of the second magnetic field applied in the direction opposite the first magnetic moment, the first magnetic moment reverses its direction.

The following definitions apply to the description of FIGS. 2–8 to follow:

$T_1$=first recording temperature $T_2$=second recording temperature higher than $T_1$ $T_a$=ambient temperature $T_{compstor}$=compensation temperature of the storage layer $T_{compbias}$=compensation temperature of the bias layer $T_{curstor}$=Curie temperature of the storage layer $T_{curbias}$=Curie temperature of the bias layer $H_1$=initializing magnetic field which converts a recorded bit in the third state to the fourth state $H_2$=applied recording magnetic field large enough to set the direction of the magnetic moment of the storage layer at $T_2 \cong T_{Curstor} > T_{Curbias}$.

State A=A recorded bit is in the first state at $T_a$.

State B=A recorded bit is in the fourth state at $T_a$ so that a horizontal domain wall 30 is provided between storage layer 16 and bias layer 20.

State C=$T_a < T_1 < T_{Curbias}$ and a recorded bit is in the first state if $H_2$ is "down" and in the third state if $H_2$ is "up".

State D=A temperature greater than $T_{curbias}$ such that the coercivity of the storage layer is less than $H_2$.

State E=A temperature between $T_a$ and $T_2$ and a recorded bit is in the first state if $H_2$ is "up" and the third state if $H_2$ is "down".

State F=A recorded bit is in the third state at $T_a$.

At $T_a$, a region of the media will be in either state (A) or state (B). Upon heating to $T_1$, the horizontal domain wall energy in state (B) is unstable, so that the bit is converted to state (C). If this region then cools back to $T_a$, it returns to state (A).

If, however, the region is heated further to $T_2$, the magnetic state of the storage layer is reversed by $H_2$, as shown in state (D). Upon cooling from state (D), the bias layer is also magnetized in accordance with the storage layer, (so as not to generate a domain wall between the layers) as shown in states (E) and (F). At $T_a$, and in the presence of $H_1$, the bias layer is re-oriented, thereby generating a domain wall between the storage and bias layers. In some cases, $H_1$ and $H_2$ may be in the same direction. As shown in the FIGS., $H_2$ may then also be strong enough so that state (E) switches directly to state (B) without the necessity of imposing $H_1$ to cause this switch.

FIGS. 2–8 show theoretical graphs of the coercivity of storage layer 16 and bias layer 20 as a function of temperature from $T_a$ through $T_1$ to $T_2$. For all of the FIGURES, the coercivity of storage layer 16 is shown by a solid line and the coercivity of bias layer 20 is shown by a dashed line.

Figure 2:
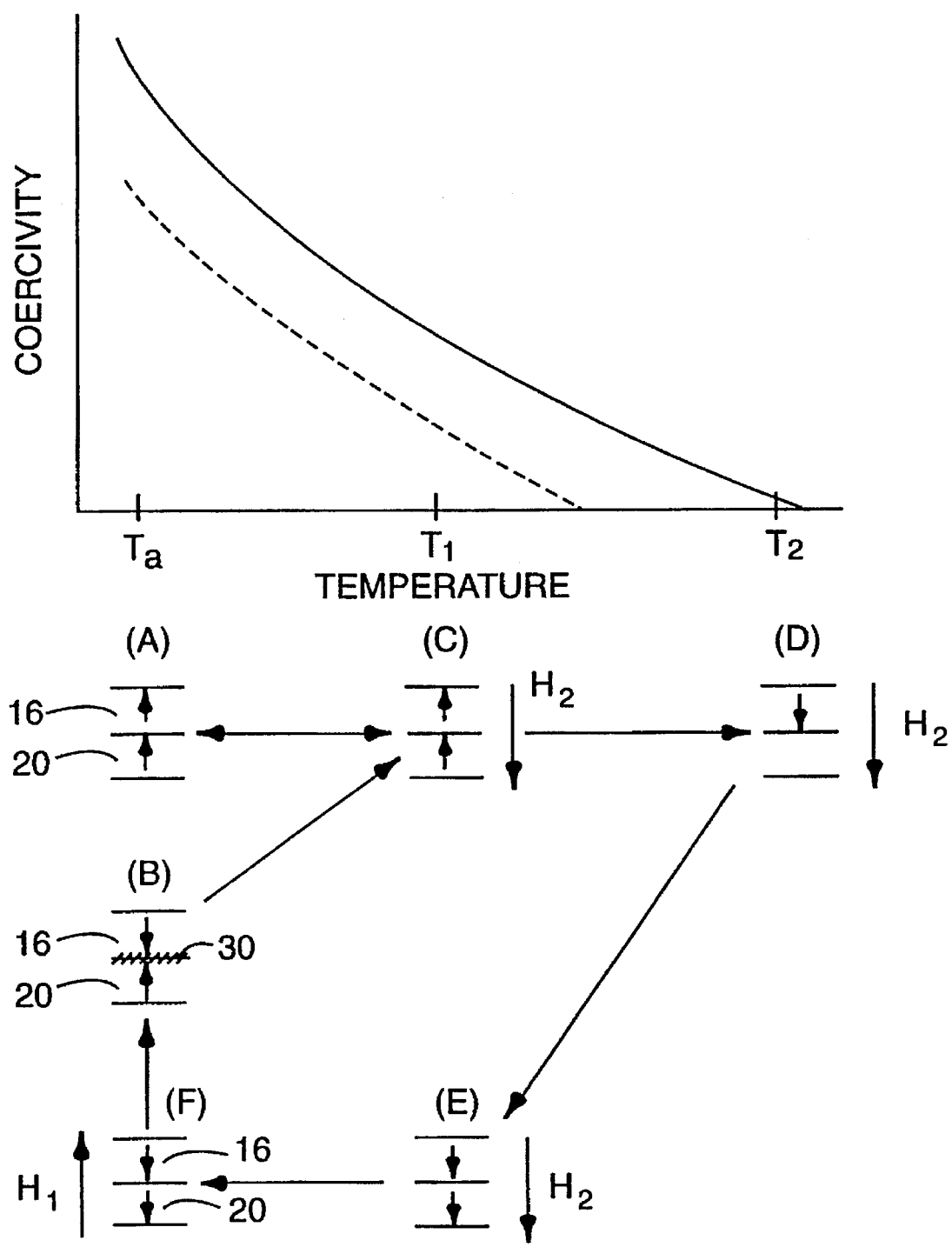
FIGS. 2–8 are theoretical graphs of the coercivity as a function of temperature for the storage and bias layers according to various embodiments of the invention.

In FIG. 2, $T_{compstor} < T_a$ and $T_{compbias} < T_a$. FIG. 2 is also representative of the situation wherein $T_{compstor} > T_{curstor}$ and $T_{curbias} > T_{curbis}$.

Figure 3:
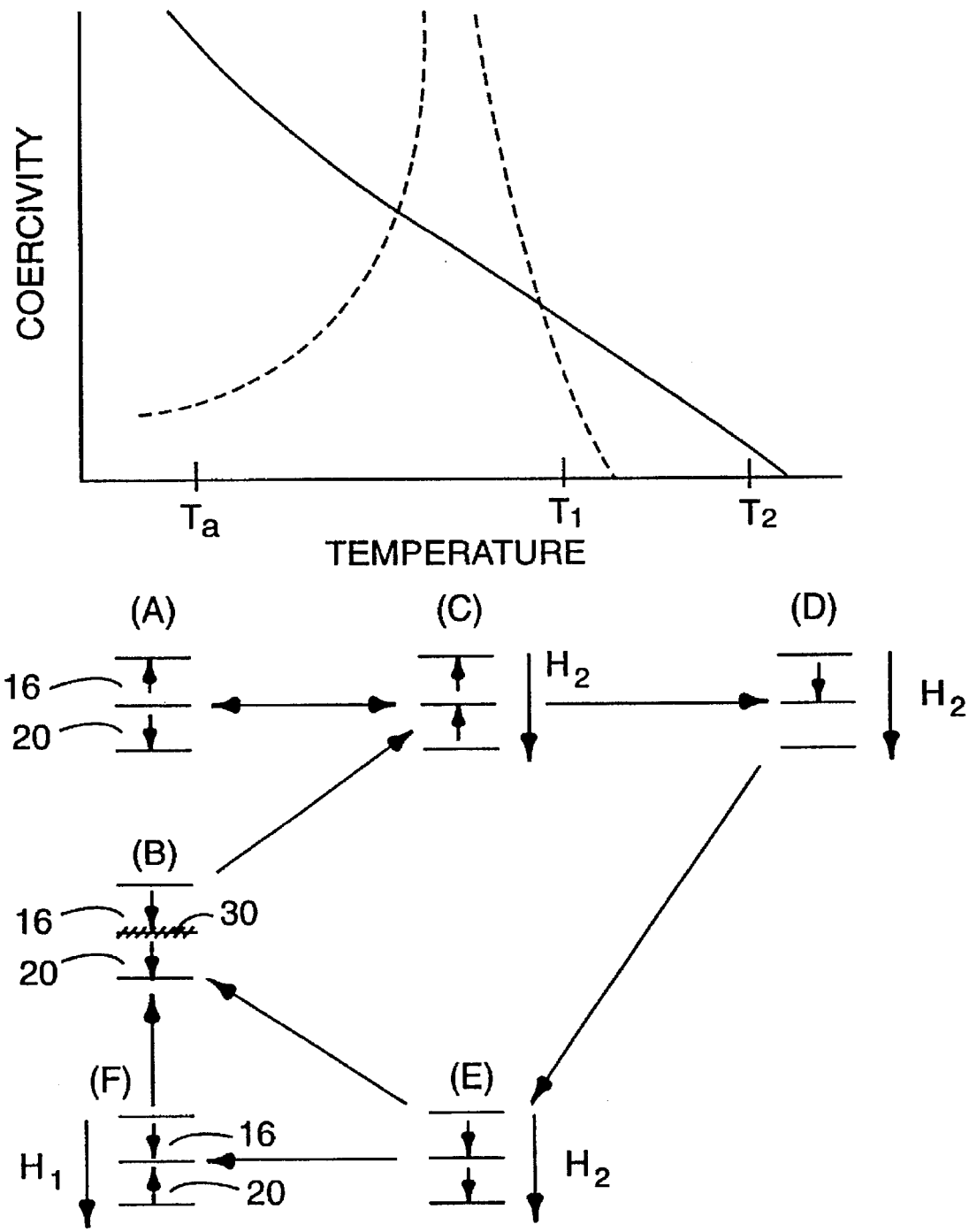

In FIG. 3, $T_{compstor} < T_a$, and $T_{curbias} > T_{compbias} > T_a$.

Figure 4:
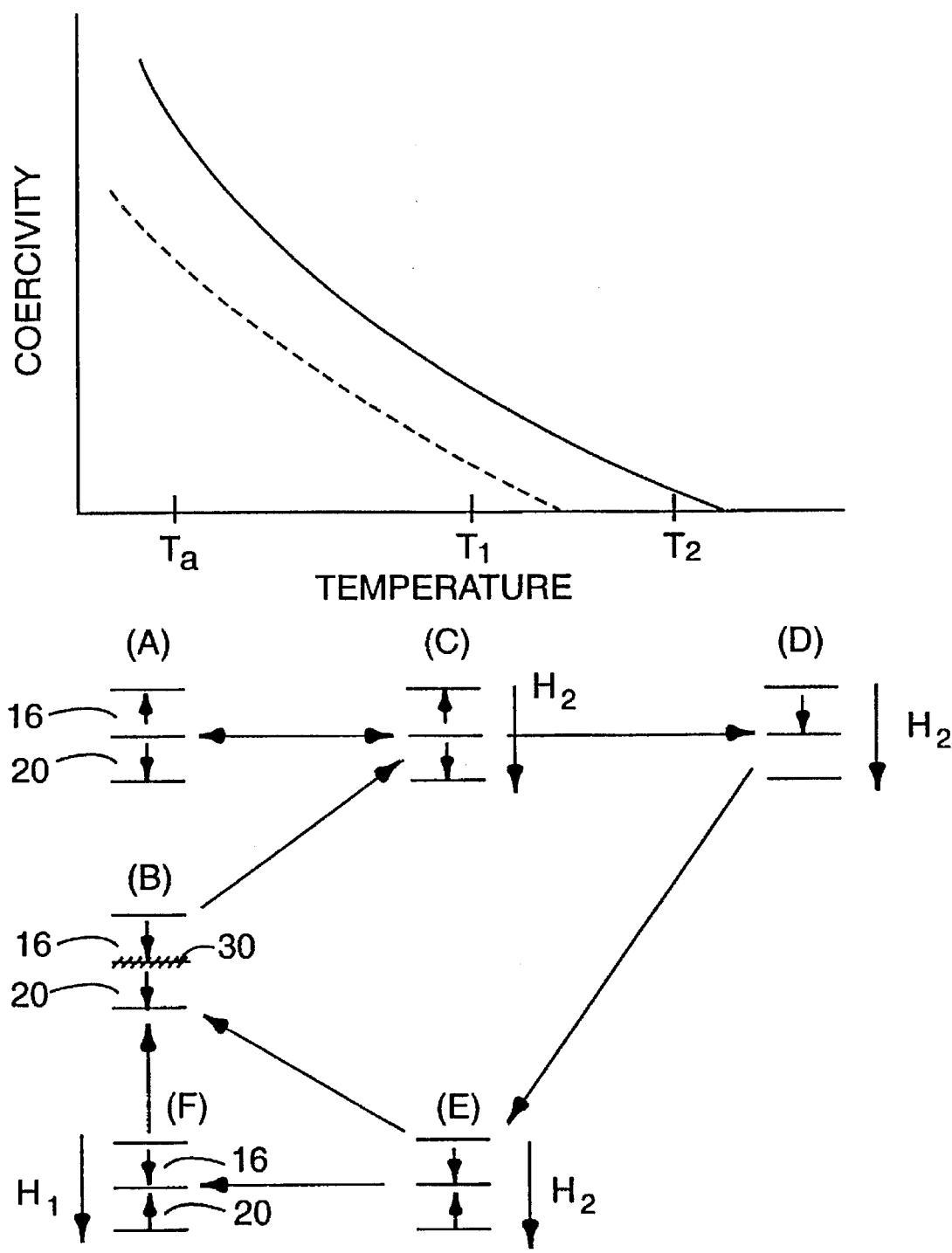

In FIG. 4, $T_{compstor} < T_a$ and $T_{compbias} > T_{curbias}$. FIG. 4 is also representative of the situation wherein $T_{compstor} > T_{curstor}$ and $T_{compbias} < T_a$.

Figure 5:
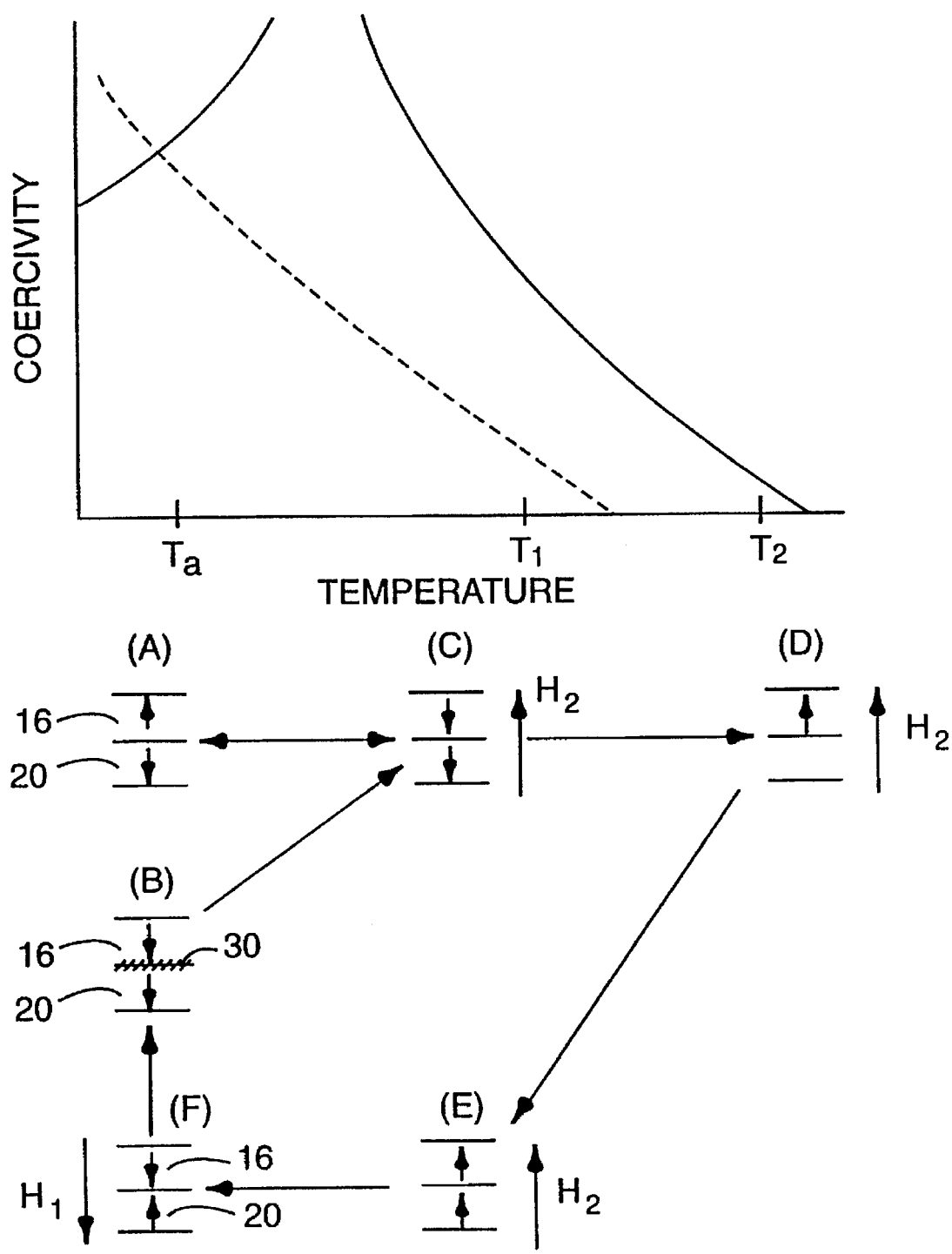

In FIG. 5, $T_{curstor} > T_{compstor} > T_a$ and $T_{compbias} < T_a$.

Figure 6:
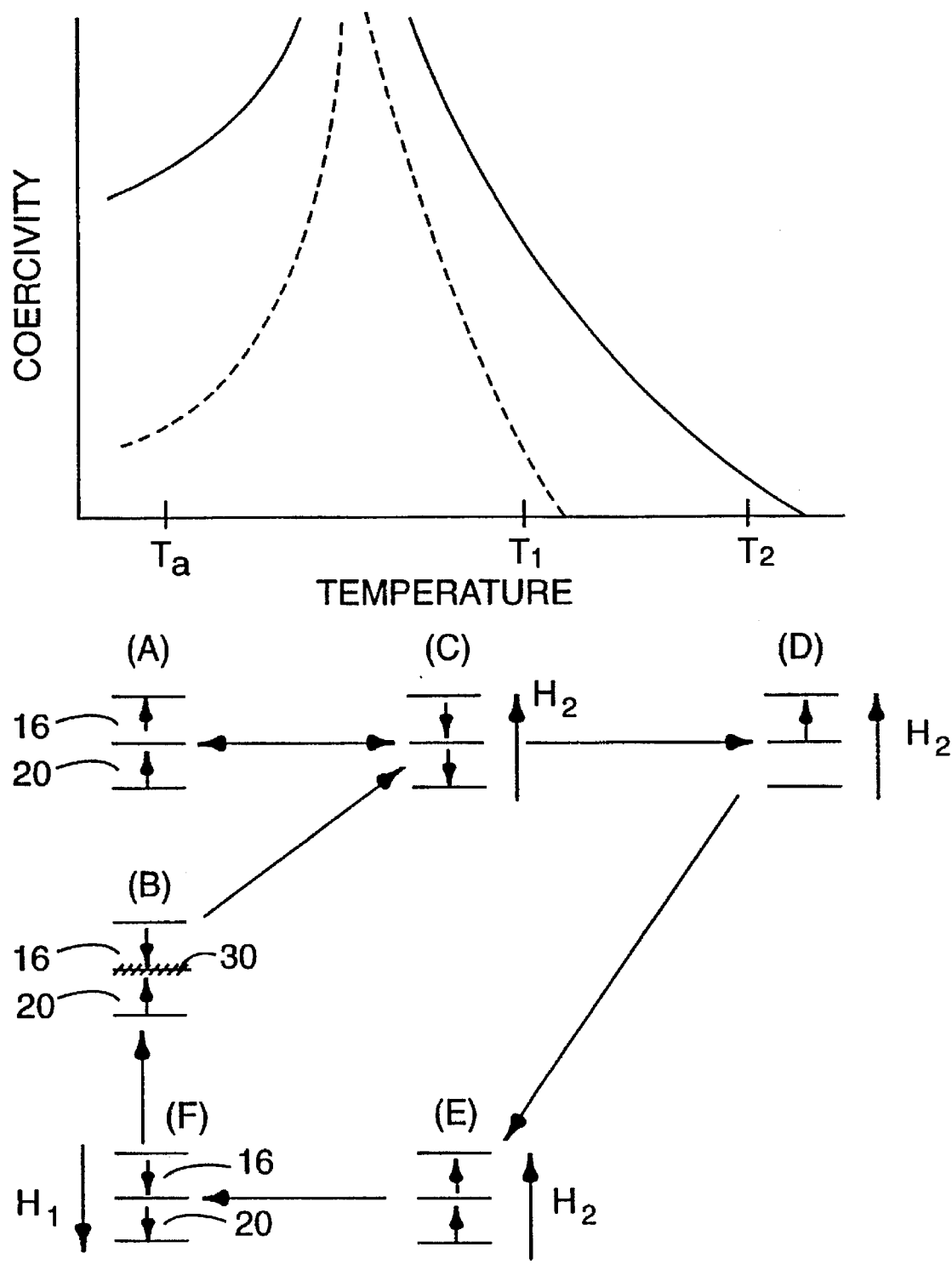

In FIG. 6, $T_{curstor} > T_{compstor} > T_a$ and $T_{curbias} > T_{combias} > T_a$.

Figure 7:
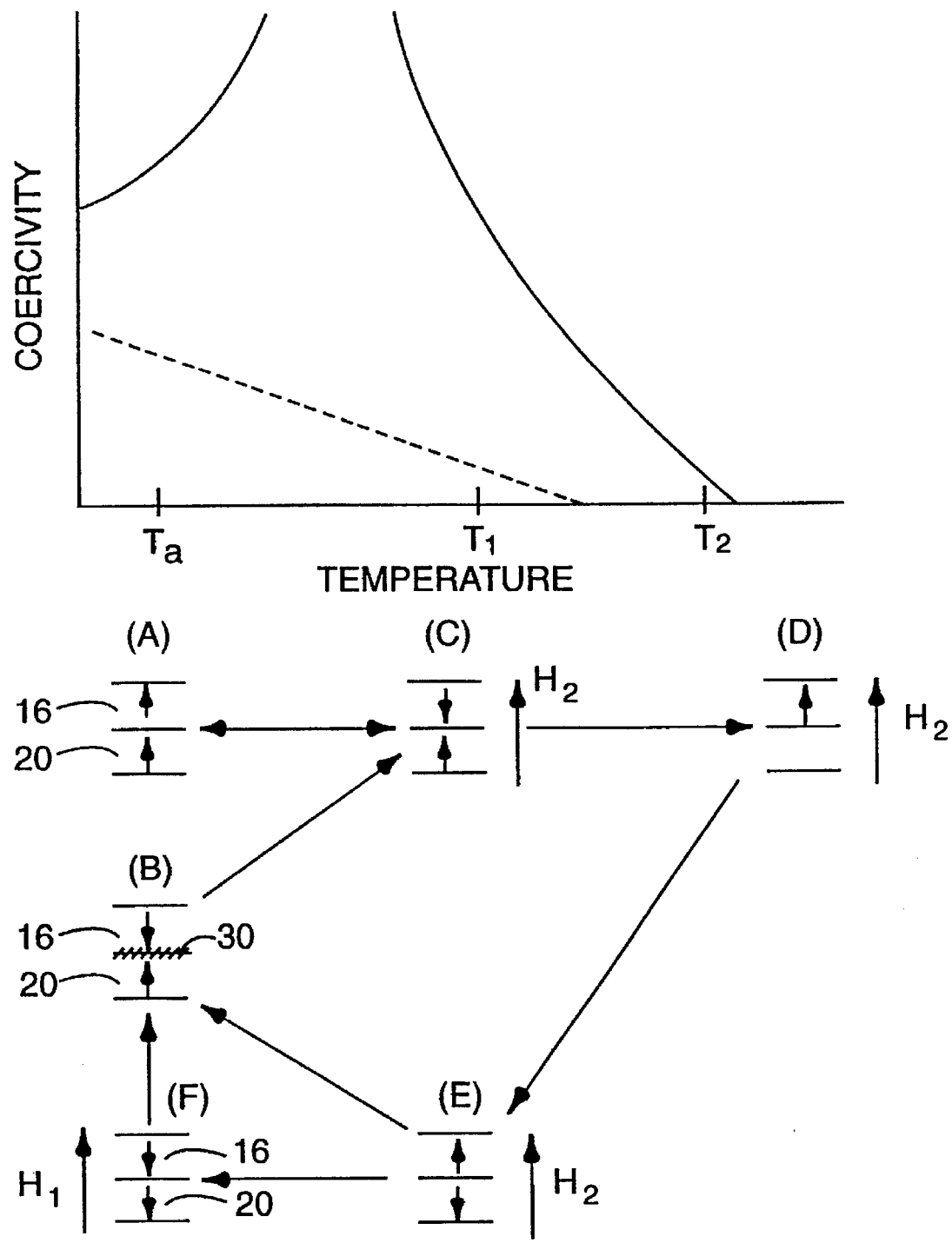

In FIG. 7, $T_{curstor} > T_{compstor} > T_a$ and $T_{compbias} > T_{curbias}$.

Figure 8:
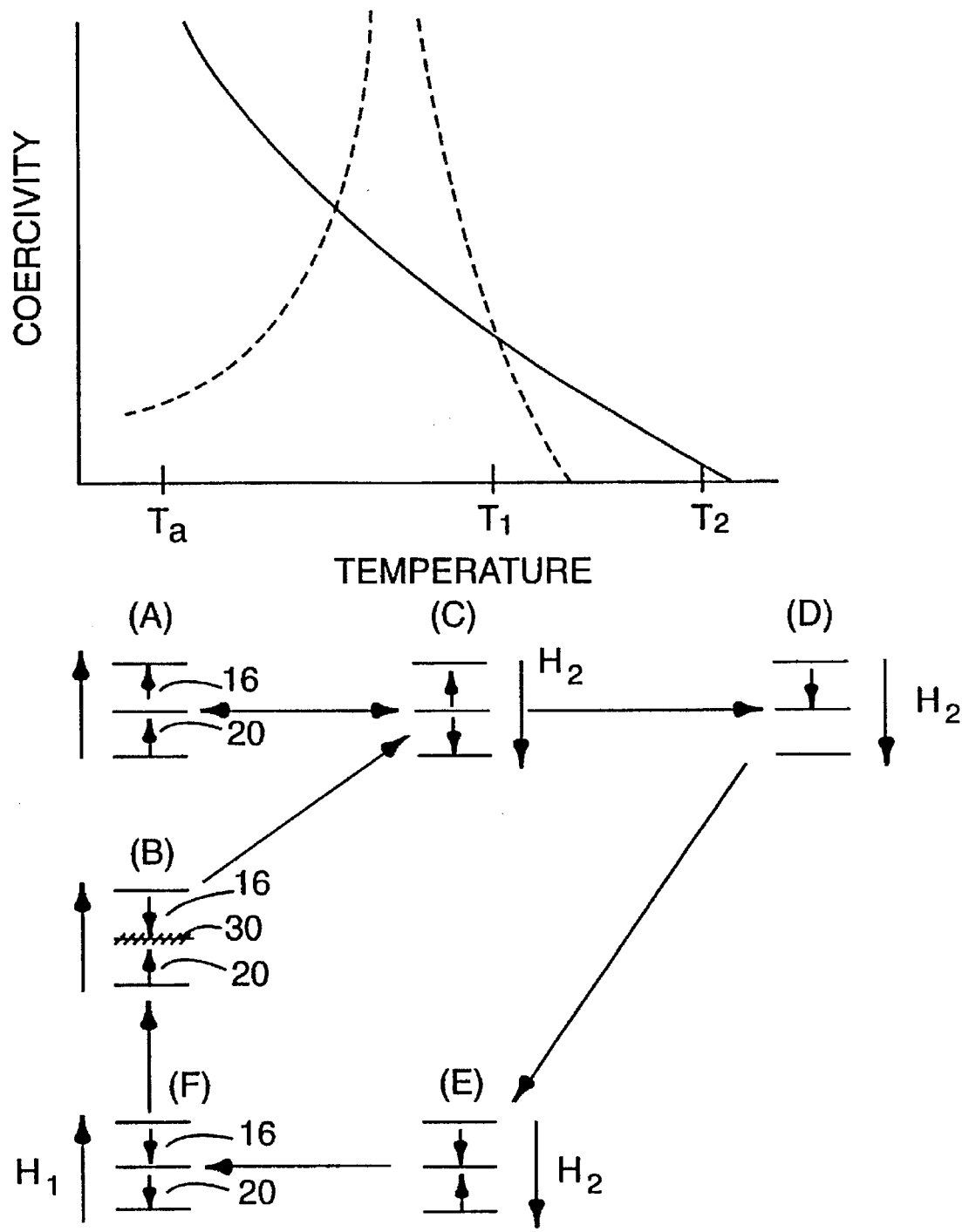

In FIG. 8, $T_{compstor} > T_{curstor}$, and $T_{curbias} > T_{compbias} > T_a$.

The present invention will now be further illustrated by the following non-limiting Example. (All measurements are approximate.)

EXAMPLE

A bilayered magneto-optic recording disk was made according to the design of FIG. 1. A 32.5 nm layer of SiC was deposited on a polycarbonate substrate. A 30 nm thick storage layer with approximate composition $Tb_{22.5}Fe_{68.0}Co_{9.5}$ and with a compensation temperature of approximately 20° C. and a Curie Temperature of 250° C. was deposited next. A 170 nm thick bias layer with approximate composition $Dy_{16.4}Tb_{13.2}Fe_{30.6}Co_{39.8}$ and with a compensation temperature of 150° C. and a Curie temperature of 210° C. was then deposited. Finally, a 25 nm thick layer of SiC was deposited.

Figure 9A:
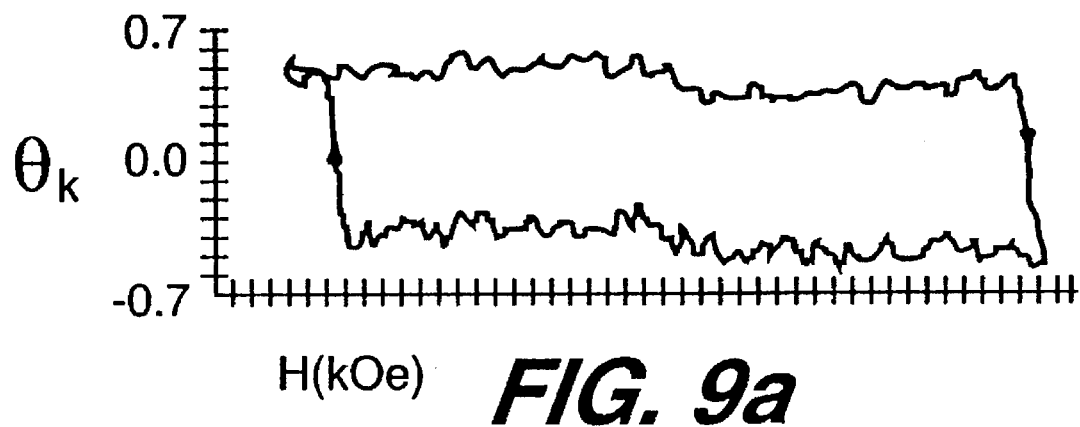
FIGS. 9–11 are experimental measurements of optical hysteresis loops of the storage and bias layers at different temperatures for the Examples described.
Figure 9B:
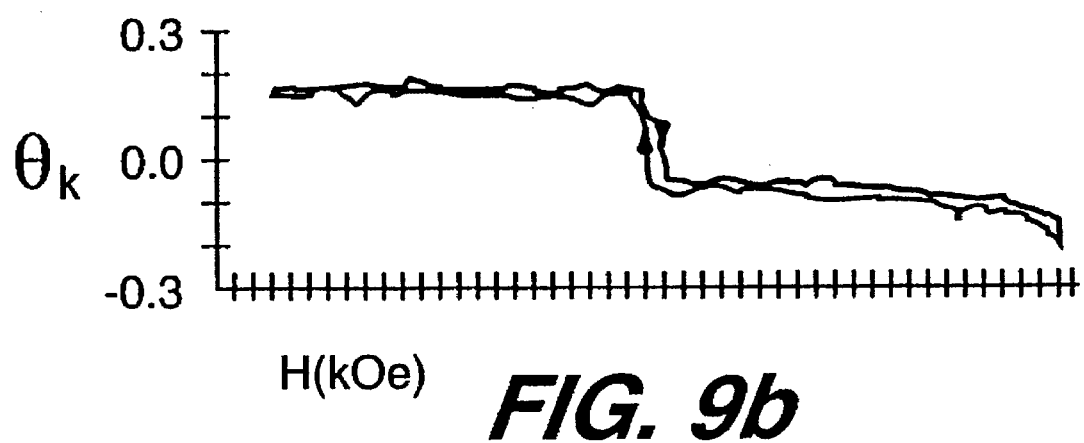
Figure 9C:
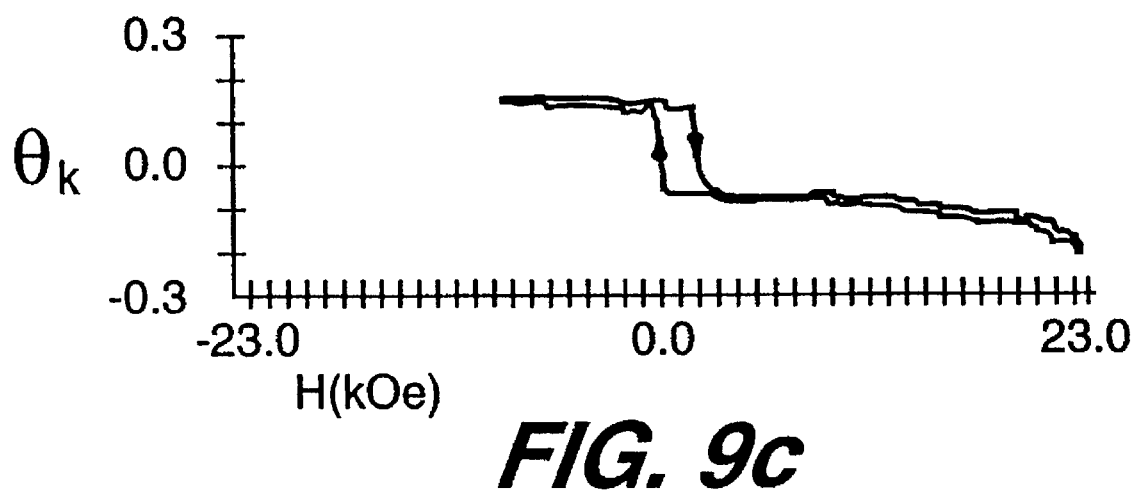

A major optical hysteresis loop at 45° C. was measured for the storage layer, as shown in FIG. 9A. Major and minor optical hysteresis loops at 45° C. were measured for the bias layer, as shown in FIGS. 9B and 9C, respectively. For fields less than −21 kOe the bilayer MO film is in the fourth state with both layers magnetized in the negative direction and a horizontal domain wall between the layers. As the applied field is increased to zero, the direction of the magnetic moment of neither the storage layer nor the bias layer changes, indicating that the fourth state is stable in accordance with the first condition.

For fields greater than +21 kOe the bilayer MO film is in the second state with both the storage layer and the bias layer magnetized in the positive direction and a horizontal domain wall between the layers. As the field is reduced to −2 kOe, the moment of the bias layer reverses direction, and the film changes into the first state with no horizontal domain wall. As the applied field is again increased, as shown in FIG. 9C, a field of 3 kOe is sufficient to again reverse the moment of the bias layer, returning the film to the second state, in accordance with the second condition.

Figure 10A:
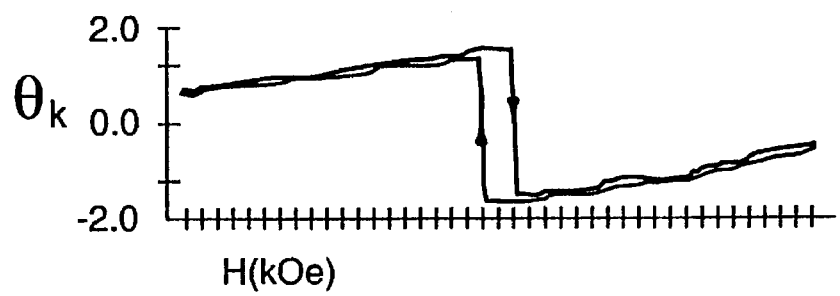
Figure 10B:
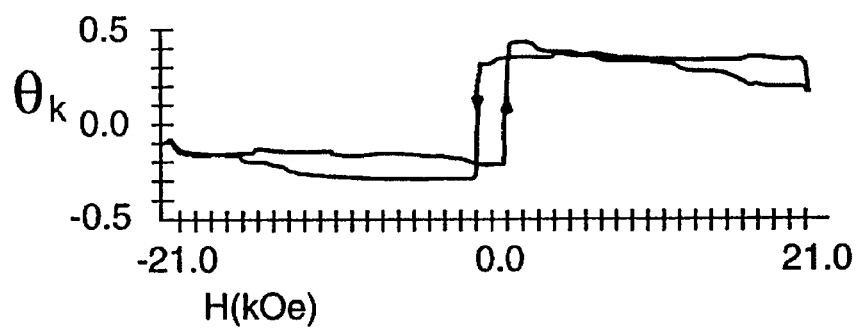

Optical hysteresis loops measured at 180° C. are shown for the storage layer in FIG. 10A, and for the bias layer in FIG. 10B. The sign of the hysteresis loop for the bias layer is opposite that of the hysteresis loop at 45° C., because 180° C. is above $T_{compbias}$. At 180° C. both storage and bias layers switch at the same applied fields. For large positive fields the film is in the first state and for large negative fields the film is in the third state. At this temperature neither the second nor fourth states are stable for any applied field. Therefore, if the film is in the second or fourth state at ambient, when it is heated to 180° C. it must switch into the first or second state. Because a disk made with this film stack exhibits direct overwrite recording, the second state must in fact switch to the third state, in accordance with the third condition.

Figure 11A:
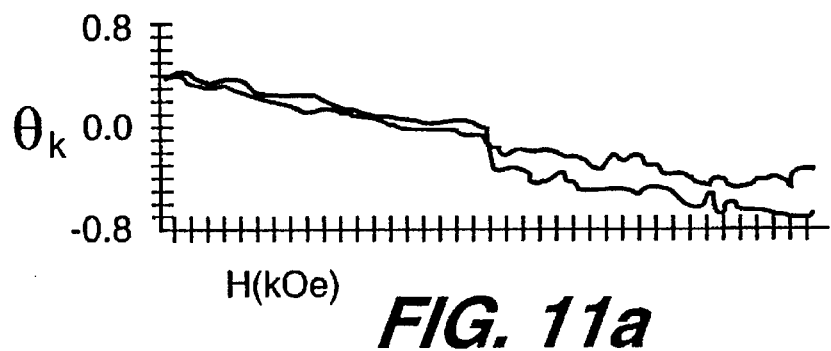
Figure 11B:
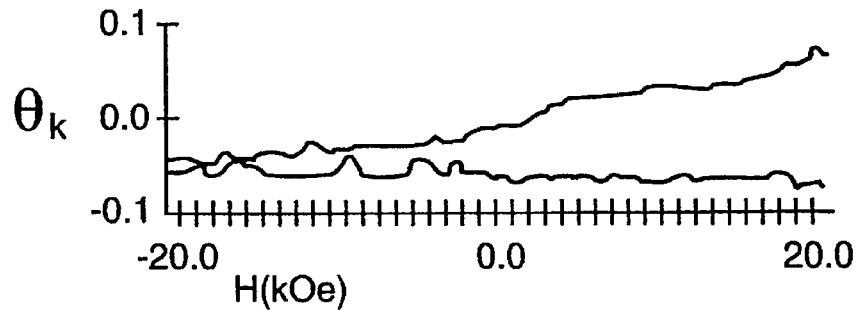

Optical hysteresis loops are shown at 240° C. for the storage layer in FIG. 11A, and for the bias layer in FIG. 11B. The storage layer still exhibits switching with very small coercivity at this temperature because $T_{curstor} > 240°$ C. The bias layer exhibits no hysteresis loop because $T_{curbias} < 240°$ C., in accordance with the condition $T_{curstor} > T_{curbias}$.

Direct overwrite carrier-to-noise ratio (CNR) was measured at a 52 mm radius, at 1800 revolutions per minute disk speed, using a 2 MHz signal (i.e., 2.45 µm bits). The high laser power was 10 mW and the low power was 4.7 mW. The write field was 100 Oe and the initializing field was 3.3 kOe. A 36 dB direct overwrite CNR was obtained.

I claim:

1. A magneto-optic recording medium for use with a recording system including a laser operable at at least two different energy levels, the medium comprising a substrate and a plurality of layers supported thereon, the layers comprising:

a magneto-optical storage layer, for maintaining areas of selected magnetic orientation, comprising a rare earth transition metal alloy, the storage layer having a first magnetic moment, a first compensation temperature, $T_{compstor}$, and a first Curie temperature, $T_{curstor}$; and a magnetic biasing layer, magnetically exchange-coupled to the storage layer, comprising a rare earth transition metal alloy, the biasing layer having a second magnetic moment, a second compensation temperature, $T_{compbias}$, and a second Curie temperature, $T_{curbias}$, wherein $T_{curstor} > T_{curbias}$;

such that a recorded bit in the layers at any temperature less than $T_{curbias}$ exists in one of four magnetic states:

a first state in which the storage layer is magnetized "up" and the bias layer is magnetized so that there is no horizontal domain wall between the layers;

a second state in which the storage layer is magnetized "up" and the bias layer is magnetized so that there is a horizontal domain wall between the layers;

a third state in which the storage layer is magnetized "down" and the bias layer is magnetized so that there is no horizontal domain wall between the layers; and a fourth state in which the storage layer is magnetized "down" and the bias layer is magnetized so that there is a horizontal domain wall between the layers;

wherein:

at ambient temperature, $T_a$, and no applied magnetic field, the fourth state is stable;

at $T_a$ in the presence of a first magnetic field applied in a direction opposite to the second magnetic moment, the third state is convened into the fourth state;

at a first recording temperature, $T_1$, wherein $T_a < T_1 < T_{Curbias}$, in the presence of a second magnetic field applied in the direction of the first magnetic moment, the fourth state is converted to the first state and the second state is converted to the third state; and at a second recording temperature, $T_2$, where $T_2 > T_1$, in the presence of a second magnetic field applied in the direction opposite the first magnetic moment, the first magnetic moment reverses its direction.

2. The medium of claim 1, wherein $T_{compstor} < T_a$ and $T_{compbias} < T_a$.

3. The medium of claim 1, wherein $T_{compstor} < T_a$ and $T_{Curbias} > T_{compbias} > T_a$.

4. The medium of claim 1, wherein $T_{compstor} < T_a$ and $T_{compbias} > T_{Curbias}$.

5. The medium of claim 1, wherein $T_{Curstor} > T_{compstor} > T_a$ and $T_{compbias} > T_a$.

6. The medium of claim 1, wherein $T_{Curstor} > T_{compstor} > T_a$ and $T_{Curbias} > T_{compbias} > T_a$.

7. The medium of claim 1, wherein $T_{Curstor} > T_{compstor} > T_a$ and $T_{compbias} > T_{Curbias}$.

8. The medium of claim 1, wherein $T_{compstor} > T_{curstor}$ and $T_{compbias} < T_a$.

9. The medium of claim 1, wherein $T_{compstor} > T_{Curstor}$ and $T_{curbias} > T_{compbias} > T_a$.

10. The medium of claim 1, wherein $T_{compstor} > T_{Curstor}$ and $T_{compbias} T_{Curbias}$.

11. The medium of claim 3, wherein at a temperature between $T_a$ and $T_{Curbias}$ in the presence of the second applied magnetic field, the third state is converted into the fourth state.

12. The medium of claim 4, wherein at a temperature between $T_a$ and $T_{Curbias}$ in the presence of the second applied magnetic field, the third state is converted into the fourth state.

13. The medium of claim 7, wherein at a temperature between $T_a$ and $T_{Curbias}$ in the presence of the second applied magnetic field, the third state is converted into the fourth state.

14. The medium of claim 8, wherein at a temperature between $T_a$ and $T_{Curbias}$ in the presence of the second applied magnetic field, the third state is converted into the fourth state.

15. The medium of claim 1, wherein the storage layer comprises terbium and at least one of iron and cobalt.

16. The medium of claim 15, the biasing layer comprises at least one of iron and cobalt.

17. A magneto-optic recording medium comprising a substrate and a plurality of layers supported thereon, the layers comprising:

a magneto-optic storage layer comprising Tb, Fe, and Co, having a Curie temperature, $T_{Curstor}$;

a magnetic biasing layer, magnetically exchange-coupled to the storage layer, comprising Dy, Tb, Fe, and Co, having a Curie temperature $T_{curbias}$, wherein $T_{curstor} > T_{curbias}$.

18. The medium of claim 17, wherein the storage layer has a composition of approximately $Tb_{22.5}Fe_{68}Co_{9.5}$.

19. The medium of claim 18, wherein the bias layer has a composition of approximately $Dy_{16.4}Tb_{13.2}Fe_{30.6}Co_{39.8}$.

20. The medium of claim 17, wherein $T_{Curstor}$ is within the range of 40° to 60° C. greater than $T_{Curbias}$.

21. A magneto-optic recording system comprising:

a laser operable at at least at two different energy levels;

means for producing a first initializing magnetic field and a second applied recording magnetic field;

a magneto-optic recording medium comprising a substrate and a plurality of layers supported thereon, the layers comprising:

a magneto-optical storage layer, for maintaining areas of selected magnetic orientation, comprising a rare earth transition metal alloy, the storage layer having a first magnetic moment, a first compensation temperature, $T_{compstor}$, and a first Curie temperature, $T_{Curstor}$; and a magnetic biasing layer, magnetically exchange-coupled to the storage layer, comprising a rare earth transition metal alloy, the biasing layer having a second magnetic moment, a second compensation temperature, $T_{compbias}$, and a second Curie temperature, $T_{Curbibas}$, wherein $T_{Curstor} > T_{Curbias}$;

such that a recorded bit in the layers at any temperature less than $T_{Curbias}$ exists in one of four magnetic states:

a first state in which the storage layer is magnetized "up" and the bias layer is magnetized so that there is no horizontal domain wall between the layers;

a second state in which the storage layer is magnetized "up" and the bias layer is magnetized so that there is a horizontal domain wall between the layers;

a third state in which the storage layer is magnetized "down" and the bias layer is magnetized so that there is no horizontal domain wall between the layers; and a fourth state in which the storage layer is magnetized "down" and the bias layer is magnetized so that there is a horizontal domain wall between the layers;

wherein:

at ambient temperature, $T_a$, and no applied magnetic field, the fourth state is stable;

at $T_a$ in the presence of a first magnetic field applied in a direction opposite to the second magnetic moment, the third state is converted into the fourth state;

at a first recording temperature, $T_1$, wherein $T_a < T_1 < T_{Curbias}$ in the presence of a second magnetic field applied in the direction of the first magnetic moment, the fourth state is converted to the first state and the second state is converted to the third state; and at a second recording temperature, $T_2$, where $T_2 > T_1$, in the presence of a second magnetic field applied in the direction opposite the first magnetic moment, the first magnetic moment reverses its direction.

22. A magneto-optic recording medium for use with a recording system comprised of a laser beam operable at at least two different energy levels, the medium comprising a substrate and a plurality of layers supported thereon, the layers comprising:

a magneto-optical storage layer, for maintaining areas of selected magnetic orientation, comprising a rare earth transition metal alloy, the storage layer having a first magnetic moment, a first compensation temperature, $T_{compstor}$, and a first Curie temperature, $T_{Curstor}$; and a magnetic biasing layer, magnetically exchange-coupled to the storage layer, comprising a rare earth transition metal alloy, the biasing layer having a second magnetic moment, a second compensation temperature, $T_{compbias}$, and a second Curie temperature, $T_{Curbias}$, wherein $T_{Curstor}$ is within the range of 40° to 60° C. greater than $T_{Curbias}$;

such that a recorded bit in the layers at any temperature less than $T_{Curbias}$ exists in one of four magnetic states:

a first state in which the storage layer is magnetized "up" and the bias layer is magnetized so that there is no horizontal domain wall between the layers;

a second state in which the storage layer is magnetized "up" and the bias layer is magnetized so that there is a horizontal domain wall between the layers;

a third state in which the storage layer is magnetized "down" and the bias layer is magnetized so that there is no horizontal domain wall between the layers; and a fourth state in which the storage layer is magnetized "down" and the bias layer is magnetized so that there is a horizontal domain wall between the layers;

wherein:

at ambient temperature, $T_a$, and no applied magnetic field, the fourth state is stable;

at $T_a$ in the presence of a first magnetic field applied in a direction opposite to the second magnetic moment, the third state is converted into the fourth state;

at a first recording temperature, $T_1$, wherein $T_a<T_1<T_{Courbias}$, in the presence of a second magnetic field applied in the direction of the first magnetic moment, the fourth state is converted to the first state and the second state is converted to the third state; and at a second recording temperature, $T_2$, where $T_2>T_1$, in the presence of a second magnetic field applied in the direction opposite the first magnetic moment, the first magnetic moment reverses its direction.

23. The medium of claim 22, wherein 180° C.$<T_{Curstor}<$260° C. and 140° C. $<T_{Curbias}<$200° C.

24. The medium of claim 22, wherein the storage layer has a composition of approximately $Tb_{22.5}Fe_{68}Co_{9.5}$.

25. The medium of claim 22, wherein the bias layer has a composition of approximately $Dy_{16.4}Tb_{13.2}Fe_{30.6}Co_{39.8}$.

26. The medium of claim 23, wherein the storage layer has a composition of approximately $Tb_{22.5}Fe_{68}Co_{9.5}$ and the bias layer has a composition of approximately $Dy_{16.4}Tb_{13.2}Fe_{30.6}Co_{39.8}$.

27. The medium of claim 24, wherein the bias layer has a composition of approximately $Dy_{16.4}Tb_{13.2}Fe_{30.6}Co_{39.8}$.

* * * * *